June 16, 1942.  E. F. HUDDLE  2,286,276
ROLLER
Filed Dec. 19, 1939
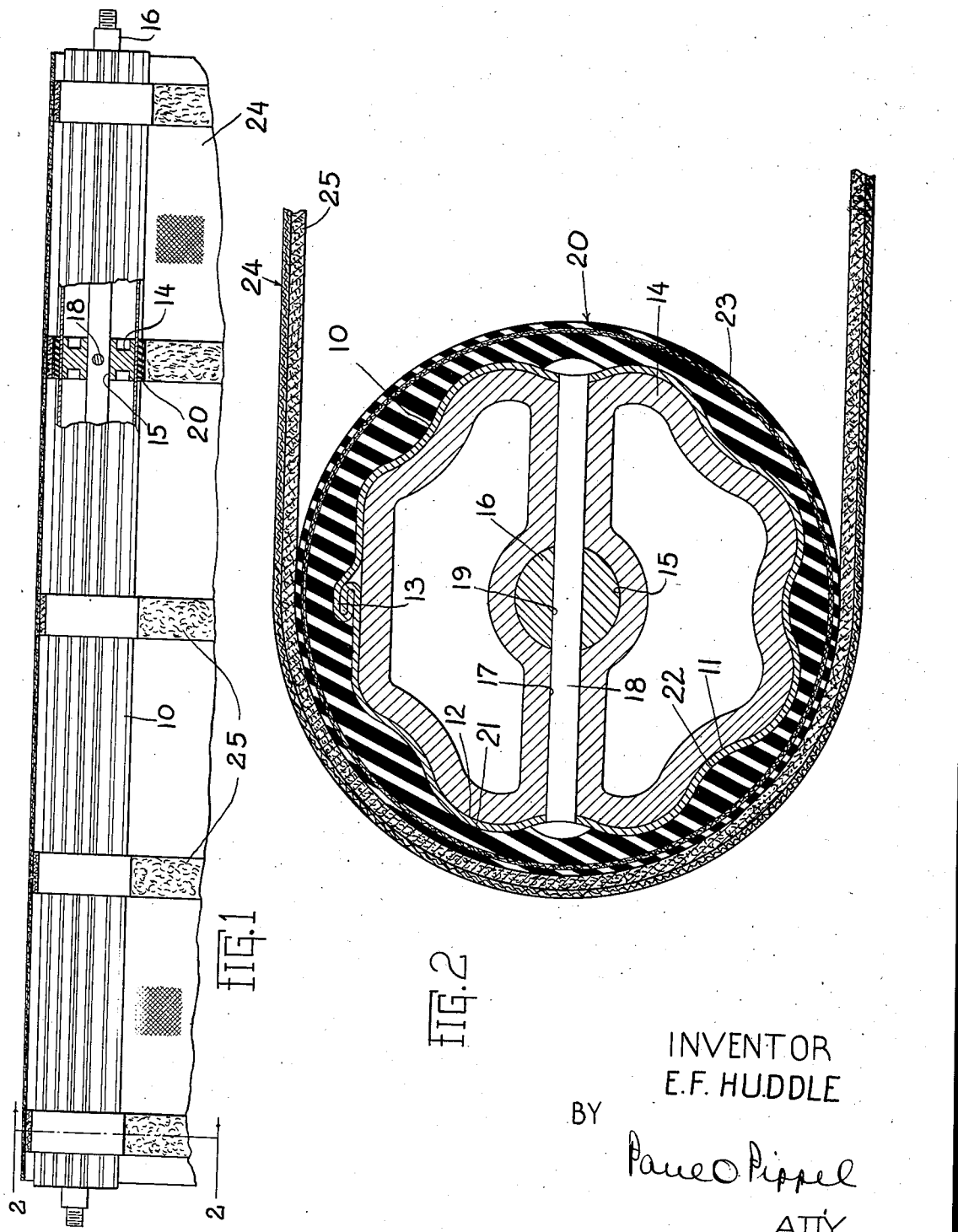
INVENTOR
E.F. HUDDLE
BY Paul O Pippel
ATTY.

Patented June 16, 1942

2,286,276

UNITED STATES PATENT OFFICE 2,286,276

ROLLER

Edwin F. Huddle, Chicago, Ill., assignor to International Harvester Company, a corporation of New Jersey Application December 19, 1939, Serial No. 310,036

1 Claim. (Cl. 74—230.7)

This invention relates to an improved roller or pulley construction, and especially to a roller of the type having an inner part and a lagging part formed of different materials.

The invention pertains especially to and has for its principal object improvements in rollers of the type used in harvesting machines wherein rollers of considerable length have trained thereabout the canvas aprons or conveyors for handling harvested material. In harvesters in general the conveying mechanisms utilize roller-driven aprons in which the rollers are formed of long cylinders of wood, since it has been found that this material is comparatively inexpensive and lacks the undesirable weight and bulk of steel or cast rollers.

Considerable difficulties have been appreciated in the use of such wooden rollers, especially since the wood has a tendency to split when provided with steel stub shafts at its ends. The wood further offers little resistance to time and the elements.

The principal object of the present invention is to provide a simplified and improved form of roller construction for the above and other purposes wherein the roller comprises a sheet-metal cylinder or tube provided with lagging of flexible material and fitted with an inner shaft-receiving member.

An important object is to provide the lagging in the form of a molded rubber driving band or sleeve.

Another object is to provide the lagging with a friction surface which more efficiently cooperates with belts, aprons or the like that may be trained thereabout.

Another object is to reenforce the lagging with a molded-in, circular layer of fabric.

Another object of prime importance is to provide the sheet-metal tube with a plurality of axially directed peripheral corrugations providing grooves in the outer periphery thereof, which grooves or corrugations serve as driving portions to be engaged by the inner periphery of the lagging sleeve.

And, another object is to provide center shaft-receiving members fitted within the tube for rotation therewith and having portions engaging the inner projections and grooves formed by the corrugations in the tube.

Briefly and specifically, these and other important objects and desirable features of the invention are achieved in one preferred form of the invention by the provision of a roller comprising a sheet-metal tube or shell having its periphery axially corrugated. The tube is adapted to be encircled by lagging preferably formed as a molded rubber sleeve reenforced by a concentric, circular layer of fabric and having integral inner peripheral portions engageable in driving relation with the corrugations of the tube. The tube carries therewithin a center shaft-receiving member, or members, having driving portions engageable with the corrugations in the tube for rotation of said member or members with the tube.

A more complete understanding of the invention may be had from the following detailed description taken in conjunction with the accompanying sheet of drawings, wherein is illustrated a preferred form of roller construction.

In the drawing—

Figure 1 is an elevational view, partly in section, illustrating a roller as associated with a conveyor of the apron type; and, Figure 2 is an enlarged sectional view taken along the line 2—2 of Figure 1.

The drawing illustrates a roller as used in conjunction with an apron type conveyor commonly associated with harvesting machines. It will be understood, of course, that the roller construction may be suitably used in other instances and may take the form of a pulley or the like.

A preferred form of roller comprises a sheet-metal cylindrical tube or shell 10 having its periphery axially corrugated to provide a plurality of alternate grooves and ribs 11 and 12 extending lengthwise thereof. The tube or shell is illustrated as a one-piece construction provided with a lap seam 13. In the present instance the tube is of considerable length and, in order to adapt the same to mounting in the particular circumstances chosen, there is provided a plurality of center members 14, which are fitted inside the tube or shell in axially spaced relation. Each center member has an outer periphery conforming generally to the corrugated periphery of the tube, and consequently the tube and members are associated for rotation together. Each center member 14 is provided with a central bore 15, through which is passed a comparatively long shaft 16. The outer ends of the shaft extend axially beyond the ends of the tube and are adapted to be suitably mounted in bearing supports, not shown. Each of the center members 14 is further provided with a diametrically extending bore 17 adapted to receive a pin or rivet 18, which further extends through diametrically opposed portions of the tube 10. The pin 18 also passes through a diametrically extending bore 19 formed in the shaft 16. The tube and center members are thus effectively secured together.

The invention further provides an outer lagging for the tube, which in the present instance is in the form of a molded rubber sleeve or driving band 20 encircling the tube 10 and having integral, inner, alternate ribs and grooves 21 and 22 cooperating respectively with the grooves and ribs 11 and 12 of the tube. The lagging is thus effectively mounted on the tube for rotation therewith. In the present instance the lagging takes the form of a plurality of bands or sleeves 20 arranged about the tube in axially spaced relation, preferably alined respectively with the center members 14. Each band 20 is reenforced by a molded-in, circular layer of fabric 23. The outer surface of each band 20 is roughened to provide a friction surface for driving engagement with a belt or apron trained thereabout.

Numeral 24 represents generally a conveyor of the canvas apron type. This apron includes a plurality of transversely spaced driving belts 25 rigidly secured thereto. Spacing of these belts 25 corresponds exactly with the spacing of the bands 20 on the tube 10. The belts 25 are formed of a material having considerably more wear-resisting qualities than the canvas of which the apron 24 is formed. The particular type of canvas is not, however, any part of the present invention except in so far as it has been chosen for purposes of illustration.

From the foregoing description it will be seen that the parts 10, 14, 16 and 20 are mounted for rotation together, and the tube and the plurality of members 14 and the bands 20 provide a compact roller assembly usable in a desirable manner in any number of instances. The possibilities of using the present roller construction as a pulley or the like are obvious and, therefore, have not been illustrated. In the construction illustrated, the bands 20 are preferably alined respectively with the center members 14. This provision accommodates the driving pressures from the belts 25 of the conveyor 24, these pressures being taken substantially directly on the center members rather than on the sheet-metal shell of the member 10. Certain other features of the construction will be apparent to those skilled in the art.

As previously mentioned, only a preferred embodiment of the invention has been illustrated and described, and it will be appreciated that numerous modifications may be made in the construction illustrated without departing from the spirit and scope of the invention as defined in the appended claim.

What is claimed is:

A roller comprising a relatively long sheet-metal tube, a plurality of relatively short center members fitting within the tube for rotation therewith and spaced axially thereof, and a plurality of relatively short driving sleeves of resilient material fitted over the tube for rotation therewith and spaced axially thereof and alined respectively with the center members.

EDWIN F. HUDDLE.